US011485667B2

(12) United States Patent
Anderson et al.

(10) Patent No.: US 11,485,667 B2
(45) Date of Patent: Nov. 1, 2022

(54) DUAL-ELEVATION EDGE ROLL SYSTEM FOR FUSED DOWNDRAW GLASS FORMING

(71) Applicant: CORNING INCORPORATED, Corning, NY (US)

(72) Inventors: James Gary Anderson, Dundee, NY (US); Olus Naili Boratav, Ithaca, NY (US); Gaozhu Peng, Horseheads, NY (US); Adam Scott Regula, Horseheads, NY (US); Alexander Lamar Robinson, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/424,601

(22) PCT Filed: Jan. 22, 2020

(86) PCT No.: PCT/US2020/014498
§ 371 (c)(1),
(2) Date: Jul. 21, 2021

(87) PCT Pub. No.: WO2020/154338
PCT Pub. Date: Jul. 30, 2020

(65) Prior Publication Data
US 2022/0089470 A1 Mar. 24, 2022

Related U.S. Application Data

(60) Provisional application No. 62/796,880, filed on Jan. 25, 2019.

(51) Int. Cl.
*C03B 17/06* (2006.01)

(52) U.S. Cl.
CPC .......... *C03B 17/068* (2013.01); *C03B 17/064* (2013.01)

(58) Field of Classification Search
None
See application file for complete search history.

(56) References Cited

U.S. PATENT DOCUMENTS

| 366,641 | A | * | 7/1887 | McArthur | ............ A47C 20/027 5/492 |
|---|---|---|---|---|---|
| 1,711,650 | A | * | 5/1929 | Pfannenstiehl | .......... G11B 3/36 369/249.1 |
| 2,620,256 | A | * | 12/1952 | Whitcomb | .............. D01F 11/02 338/180 |
| 3,196,331 | A | * | 7/1965 | Blickstein | ................ H01G 5/12 361/295 |
| 3,338,696 | A | | 8/1967 | Dockerty | |
| 3,635,687 | A | | 1/1972 | Dunlap et al. | |
| 3,682,609 | A | | 8/1972 | Dockerty | |

(Continued)

FOREIGN PATENT DOCUMENTS

JP 2015-040139 A 3/2015

OTHER PUBLICATIONS

International Search Report and Written Opinion of the International Searching Authority; PCT/US2020/014498; dated Jun. 4, 2020; 9 pages; European Patent Office.

*Primary Examiner* — Lisa L Herring
(74) *Attorney, Agent, or Firm* — Ryan T. Hardee; Grant A. Gildehaus

(57) ABSTRACT

Various improvements for dual-elevation edge roll system used in fused downdraw glass forming process are disclosed.

7 Claims, 13 Drawing Sheets

(56) References Cited

U.S. PATENT DOCUMENTS

| | | | |
|---|---|---|---|
| 4,906,905 A * | 3/1990 | Fuchigami | C03B 27/0442 65/351 |
| 5,839,321 A * | 11/1998 | Siemons | F16H 25/2006 74/89.42 |
| 7,231,786 B2 | 6/2007 | Cimo et al. | |
| 7,371,113 B2 | 5/2008 | Burris et al. | |
| 8,393,178 B2 | 3/2013 | Aniolek et al. | |
| 8,904,822 B2 | 12/2014 | Leblanc et al. | |
| 9,517,961 B2 | 12/2016 | Wada et al. | |
| 10,392,288 B2 | 8/2019 | Boratav et al. | |
| 10,640,410 B2 | 5/2020 | Boratav et al. | |
| 2001/0046427 A1 * | 11/2001 | Erikson | B23Q 5/40 411/197 |
| 2005/0268657 A1 | 12/2005 | Adamowicz et al. | |
| 2005/0268658 A1 | 12/2005 | Adamowicz et al. | |
| 2012/0304695 A1 | 12/2012 | Lakota et al. | |
| 2014/0352356 A1 | 12/2014 | Anderson et al. | |
| 2016/0091130 A1 | 3/2016 | Thompson | |

\* cited by examiner

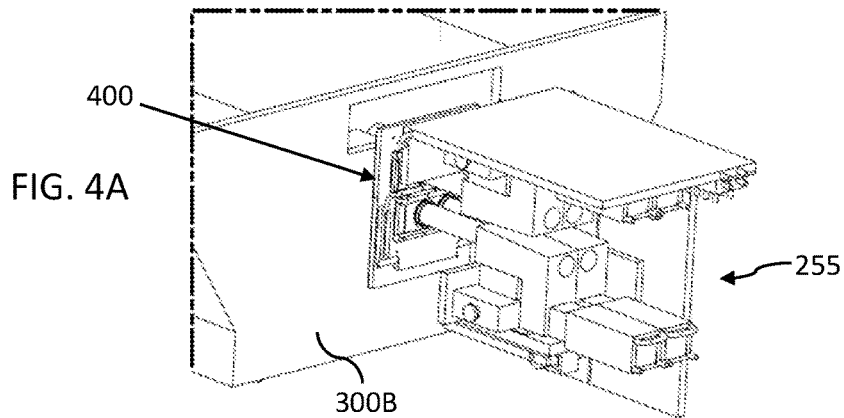
FIG. 4A
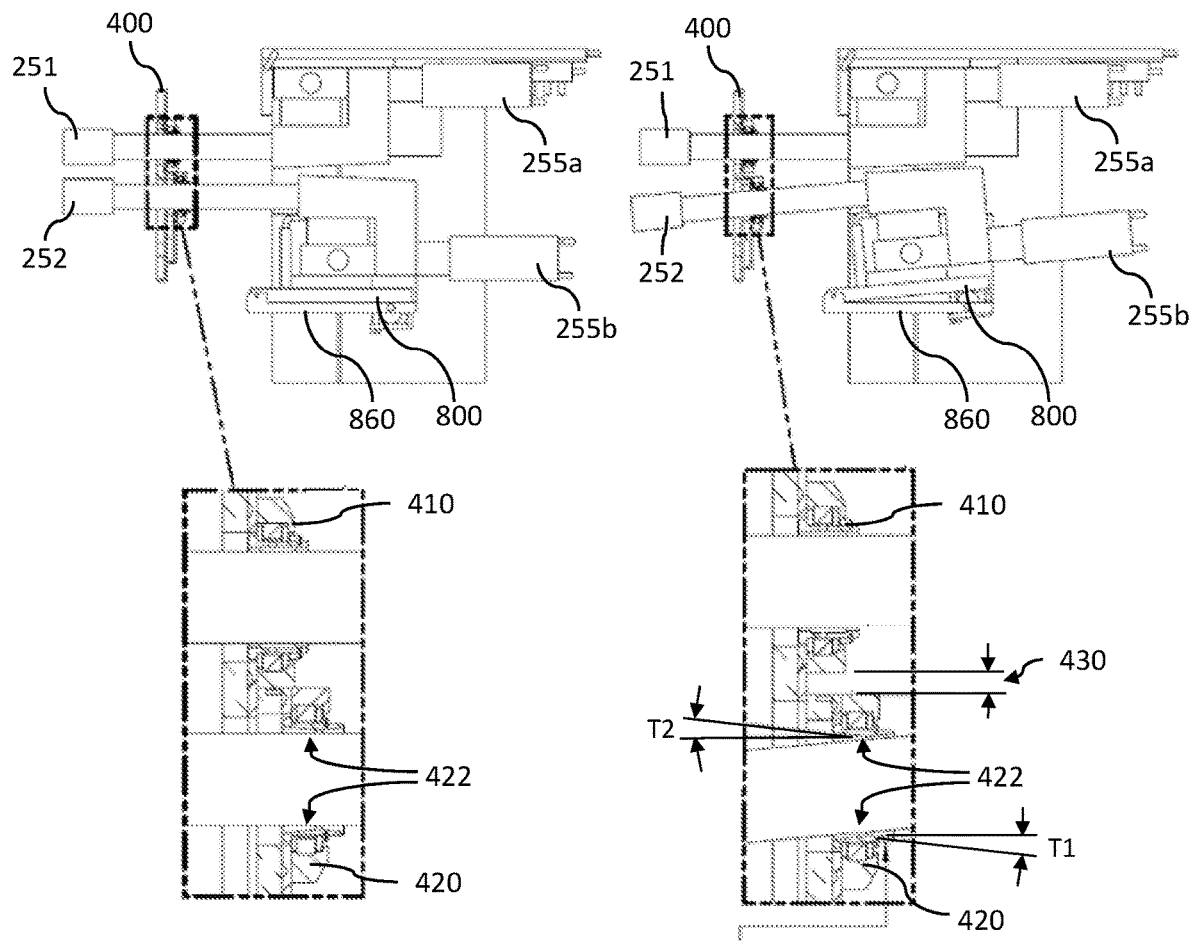
FIG. 4B
FIG. 4C
Dual Elevation Edge Roll Shaft Seal Plate Bushing with double taper to allow for tilting capability

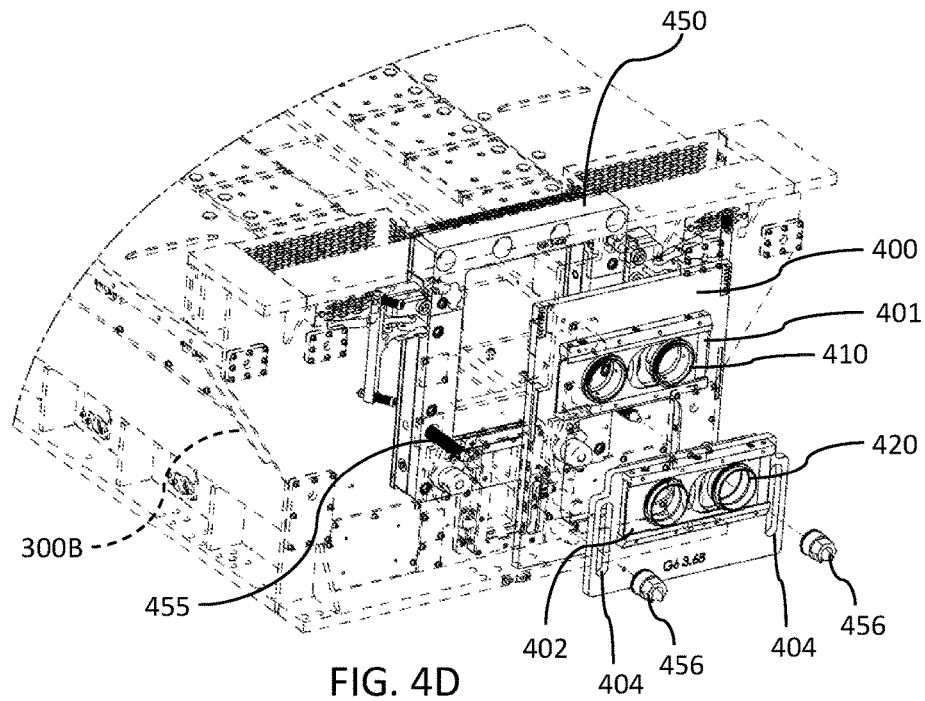
FIG. 4D
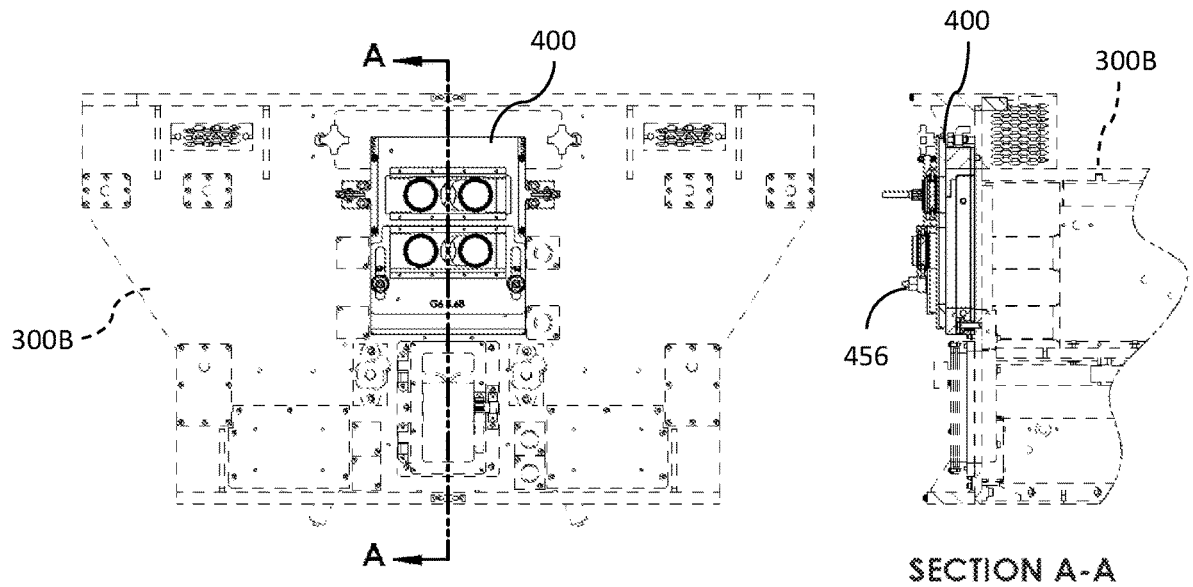
FIG. 4E
SECTION A-A
FIG 4F

SECTION B-B

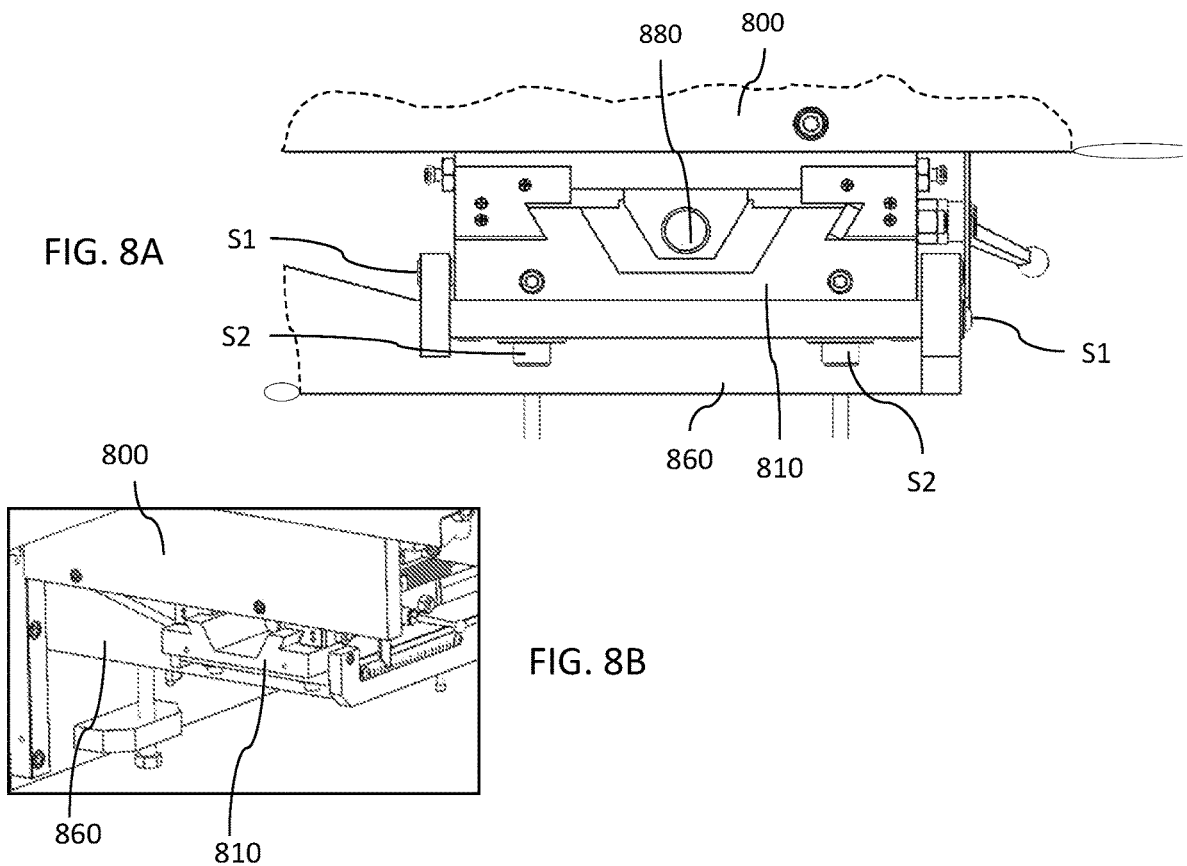
FIG. 8A
FIG. 8B
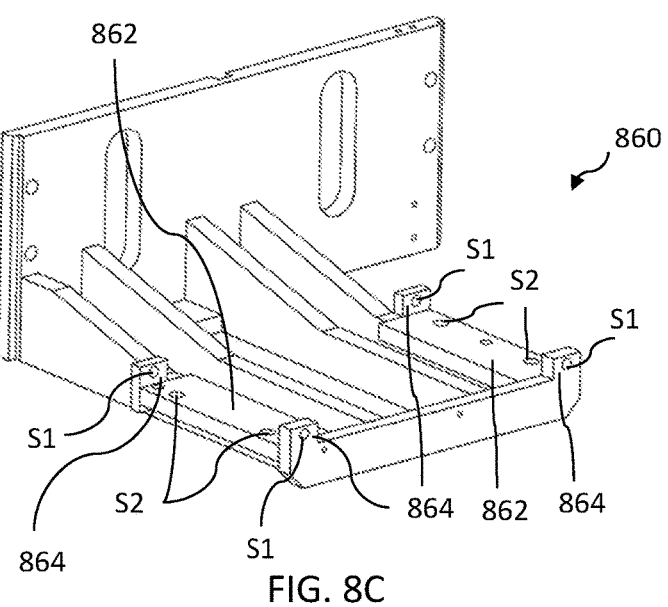
FIG. 8C

DUAL-ELEVATION EDGE ROLL SYSTEM FOR FUSED DOWNDRAW GLASS FORMING

CROSS-REFERENCE TO RELATED APPLICATIONS

This application is a national stage entry of International Patent Application Serial No. PCT/US2020/014498, filed on Jan. 22, 2020, which in turn, claims the benefit of priority under 35 U.S.C. § 119 of U.S. Provisional Application Ser. No. 62/796,880 filed on Jan. 25, 2019, the contents of each of which are relied upon and incorporated herein by reference in their entireties.

FIELD OF THE DISCLOSURE

The present disclosure relates to methods and systems for forming a glass sheet, and more particularly for forming a glass sheet by drawing sheet glass using edge rolls for minimizing the amount of sheet width attenuation.

BACKGROUND

Glass display panels are used in a variety of applications, from hand-held mobile devices to tablets to computer monitors to television displays.

One method of producing glass for optical displays is by an overflow downdraw process (also known as a fusion downdraw process). This process produces pristine surface quality compared to other processes referred to as the float and slot techniques in the literature. U.S. Pat. Nos. 3,338,696 and 3,682,609 (Dockerty), which are incorporated in their entirety herein by reference, disclose a fusion downdraw process which includes flowing a molten glass over the edges, or weirs, of a forming wedge. See also U.S. Patent Publications Nos. 2005/0268657 and 2005/0268658, the contents of which are also incorporated herein in their entireties by reference. The molten glass flows over converging forming surfaces of the forming wedge, and the separate flows reunite at the apex, or root, where the two converging forming surfaces meet, to form a glass ribbon, or sheet. Thus, the glass which has been in contact with the forming surfaces is located in the inner portion of the glass sheet, and the exterior surfaces of the glass sheet are contact-free.

The sheet as it evolves decreases in thickness under the forces of gravity and pulling equipment. In particular, pulling rolls are placed downstream of the forming wedge's root and to adjust the rate at which the ribbon leaves the forming wedge, and thus help determine the thickness of the finished sheet. The pulling equipment is located sufficiently downstream so that the viscous glass has cooled and become rigid enough to be pulled. The contacted edge portions are later removed from the finished glass sheet. As the glass ribbon descends from the root of the forming wedge, it cools to form a solid, elastic glass ribbon, which may then be cut to form smaller sheets of glass.

The glass sheet that is produced by the fusion downdraw process, however, has a narrower width than the viscous glass ribbon at the root. This loss of width is due to contraction of the glass ribbon laterally within the viscous region of the drawing process, which is also referred to as sheet width attenuation. Contraction of the ribbon laterally during the viscous phase of the drawing process is also related to an instability known as sheet width variation, which may be characterized by unstable velocity contours within the viscous glass sheet.

The loss of sheet width within the viscous region of the downdraw process also manifests itself as accumulated thickness, or beads, at the edges of the sheet. Due to the differences in both thickness and temperature between the beads and the center of the sheet, the formation of these edge beads gives rise to a multitude of issues. For example, the formation of edge beads can cause temporary stresses that produce an unstable ribbon shape during the draw process and/or permanent stresses in certain regions of the sheet upon cooling of the glass. The edge beads may also prevent an operator from bending the glass ribbon to a desired radius of curvature, such as may be necessary where the glass is prepared for use in certain applications. Thus, systems for drawing sheet glass, such as fusion draw systems, utilizing single-elevation edge roll or dual-elevation edge rolls have been introduced in the industry. In order to optimize certain aspects of implementation of such fusion draw systems, improvements in various aspects of the fusion draw system hardware are desired.

SUMMARY

The disclosure relates, in various embodiments, to improvements to apparatuses, or systems, for drawing sheet glass, such as from the root of a forming wedge in a fusion downdraw process utilizing dual-elevation edge roll technology. Embodiments are also applicable to other glass forming processes such as a slot drawing process, a double fusion process, a float process, and the description of some embodiments with reference to a fusion downdraw system should not limit the scope of the claims appended herewith.

The dual-elevation edge roll system disclosed herein significantly decreases the amount of sheet width attenuation and thereby produce increased useable sheet width allowing more efficient utilization of the glass sheet. It also presents a way to decrease the bead mass and change the distribution of the edge mass for improved process stability and product attribute.

The apparatus disclosed here consists of dual-elevation edge rolls and method of use the same in fusion draw. The position of the pairs of edge rolls can be adjusted to achieve desired tilt angle for the edge rolls' rotational axes. The design features listed below are all directed at reducing sheet width attenuation below the root of the sheet forming wedge or inducing tension across the ribbon thereby increasing sheet width. The improvements disclosed herein allows the fusion draw process to deliver substantially thinner bead for process improvement and also provide reduced end flow instability such as thickness flapping and sheet width variation.

According to some embodiments, an apparatus is disclosed that comprises a sliding table; a slide screw threadably engaging the sliding table, wherein the sliding table moves linearly along a longitudinal direction of the slide screw when the slide screw is turned; and a control shaft oriented in a longitudinal direction that is substantially orthogonal to the longitudinal direction of the slide screw and engaging the slide screw, wherein the slide screw can be turned by turning the control shaft.

According to other embodiments, a coaxial locking collar assembly is disclosed. The coaxial locking collar assembly comprises a collar piece and a threaded bushing. The collar piece comprises a locking portion comprising a central bore extending there through for receiving a threaded screw there through, and a fixed portion comprising a second central bore that is coaxially aligned with the central bore of the locking portion. The threaded bushing comprises a central bore that extends through its entire length and a male threaded portion, wherein the second central bore of the fixed portion is female threaded for threadably receiving the male threaded portion of the threaded bushing, and wherein when the threaded bushing is threaded into the second central bore of the fixed portion, the central bore of the threaded bushing and the central bore of the locking portion are coaxially aligned for receiving the threaded screw there through.

A support bracket is also disclosed. The support bracket comprising a plurality of bottom supporting surfaces, each comprising one or more adjustable set screws that can be raised and lowered; and a plurality of side supporting surfaces, each comprising one or more adjustable set screws that can be raised and lowered with respect to the side supporting surfaces; wherein when an object is placed on the support bracket and contacts the plurality of bottom supporting surfaces and the plurality of side supporting surfaces, the object's vertical position and attitude can be adjusted by adjusting the one or more adjustable set screws on each of the plurality of bottom supporting surfaces and the object's lateral position or attitude can be adjusted by adjusting the one or more adjustable set screws on each of the plurality of side supporting surfaces.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

These figures are provided for the purposes of illustration, it being understood that the embodiments disclosed and discussed herein are not limited to the arrangements and instrumentalities shown.

FIGS. 4A-4F are illustrations showing a seal plate which provides sealing and a thermal barrier for the edge rollers and allow the edge rollers to penetrate into the upper transition portion and into the fusion downdraw system's interior. FIG. 4A is an isometric view of the upper transition portion of the fusion downdraw system with a dual-elevation edge roll assembly and a sealing plate in an operational position. FIG. 4B is a side elevation view of the dual-elevation edge roll assembly and the seal plate from FIG. 4A with the inset showing a close-up cross-sectional view of the edge rollers extending straight through the seal plate. FIG. 4C is a side elevation view of the dual-elevation edge roll assembly and the seal plate from FIG. 4A with the inset showing a close-up cross-sectional view of the edge rollers extending through the seal plate where the lower edge rollers are oriented with a downward tilt. FIG. 4D is an isometric exploded view of the seal plate structure where the upper transition portion is shown in phantom lines. FIG. 4E is a front elevation view of the seal plate with the upper transition portion shown in phantom lines. FIG. 4F is a side elevation view of the seal plate in position with the upper transition portion shown in phantom lines.

FIG. 5A is an isometric view of the dual-elevation edge roll assembly showing the various cooling plates in position according to an embodiment. The cooling liquid flow channels are provided internally in each cooling plate so normally not visible but they are visibly illustrated in the figures for discussion purposes. FIG. 5B is an isometric view of one of the upper edge roller assembly and the associated top cooling plate with the inset providing a close-up view.

FIG. 6A is an isometric view of a dual-elevation edge roll assembly. FIG. 6B is a top view of the dual-elevation edge roll assembly of FIG. 6A, with the top cooling plate and the upper edge rollers removed so that the view is what you see when looking down at the lower edge rollers. FIG. 6C is a sectional view of the structure shown in FIG. 6B taken through the plane B-B noted in FIG. 6B. FIG. 6D is an isometric view of the mechanism showing the bevel gear arrangement.

FIGS. 8A-8D illustrate a mechanism for adjusting the position and attitude of the lower edge roller drive assembly according to the present disclosure. FIG. 8A is an end view of a sliding table showing its configuration as mounted on a bracket. FIG. 8B is an isometric view of the slide table and bracket assembly of FIG. 8A. FIG. 8C is an isometric view of the bracket. FIG. 8D is a top-down view of the duel-elevation edge roll assembly of the present disclosure.

While this description can include specifics, these should not be construed as limitations on the scope, but rather as descriptions of features that can be specific to particular embodiments.

DETAILED DESCRIPTION

Various embodiments for luminescent coatings and devices are described with reference to the figures, where like elements have been given like numerical designations to facilitate an understanding.

It also is understood that, unless otherwise specified, terms such as "top," "bottom," "outward," "inward," and the like are words of convenience and are not to be construed as limiting terms. In addition, whenever a group is described as comprising at least one of a group of elements and combinations thereof, the group can comprise, consist essentially of, or consist of any number of those elements recited, either individually or in combination with each other.

Similarly, whenever a group is described as consisting of at least one of a group of elements or combinations thereof, the group can consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified Those skilled in the art will recognize that many changes can be made to the embodiments described while still obtaining the beneficial results of the invention. It also will be apparent that some of the desired benefits of the present disclosure can be obtained by selecting some of the described features without using other features. Accordingly, those of ordinary skill in the art will recognize that many modifications and adaptations are possible and can even be desirable in certain circumstances and are part of the invention. Thus, the following description is provided as illustrative of the principles of the present disclosure and not in limitation thereof.

Those skilled in the art will appreciate that many modifications to the exemplary embodiments described herein are possible without departing from the spirit and scope of the invention. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

Figure 1A:
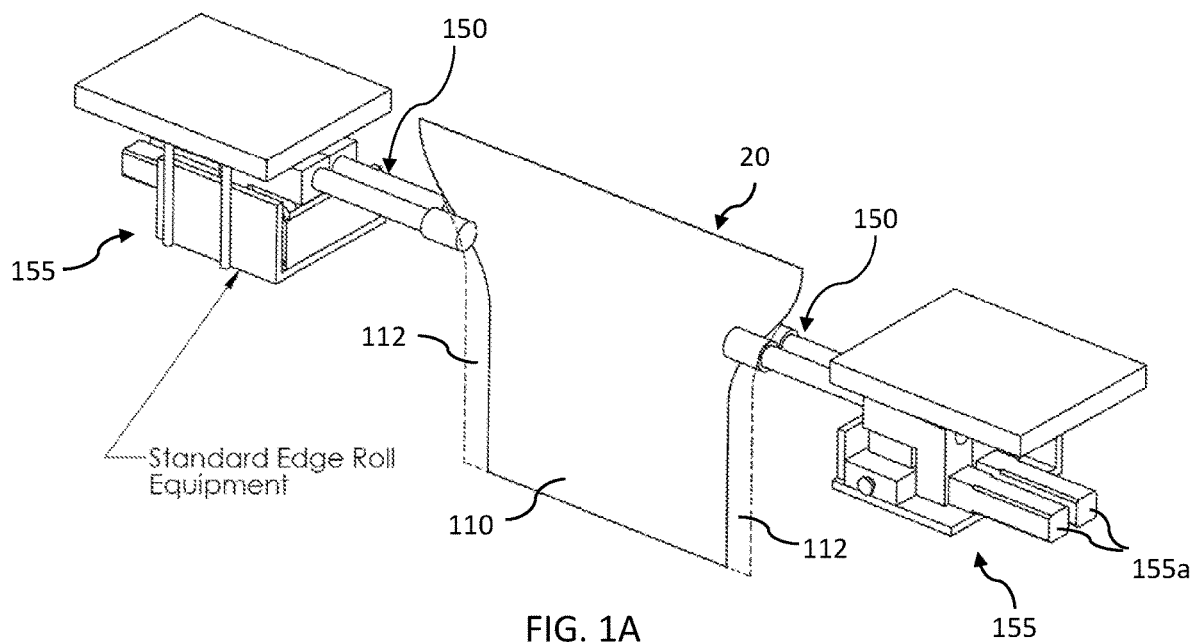
FIGS. 1A-1B show an example prior art arrangement of single-elevation edge rollers in communication with a glass sheet/ribbon being drawn in a downdraw process.
Figure 1B:
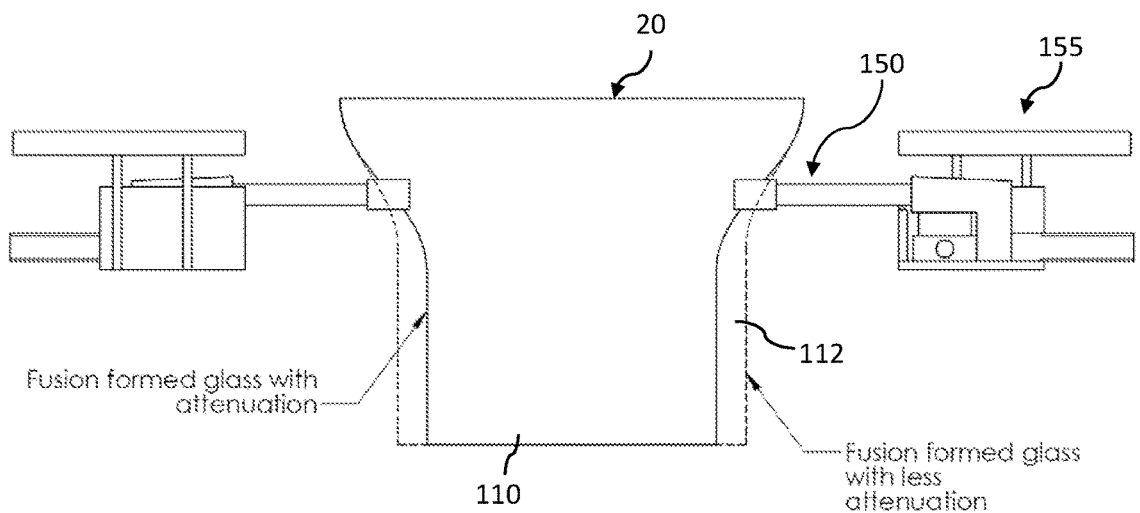

FIGS. 1A-1B show an example prior art arrangement of a single-elevation edge roll system in a fused downdraw system. The edge rollers 150 engage the glass sheet/ribbon 110 being drawn in the downdraw process. The glass sheet 110 is shown downstream of the substantially horizontal forming wedge root 20 of the forming wedge (not shown). Each of the single-elevation edge rollers 150 is driven by an appropriate drive motor 155a provided in an associated single-elevation edge roller assembly 155. The region 112 along the edge of the glass sheet 110 represents the additional glass sheet width gained by the use of the edge rollers 150.

Figure 1C:
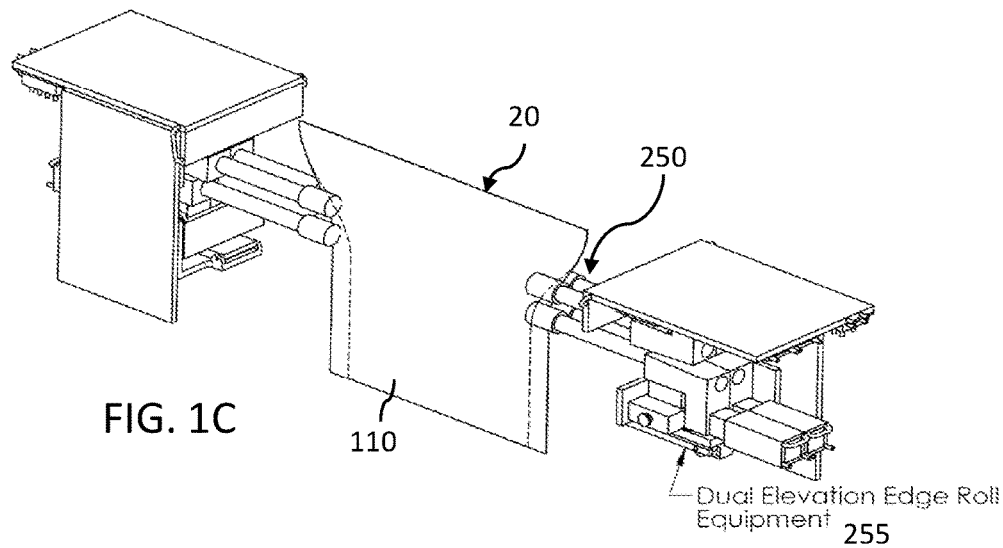
FIGS. 1C, 1D, and 1E show an example arrangement of dual-elevation edge rollers in communication with a glass sheet/ribbon being drawn in a downdraw process.
Figure 1D:
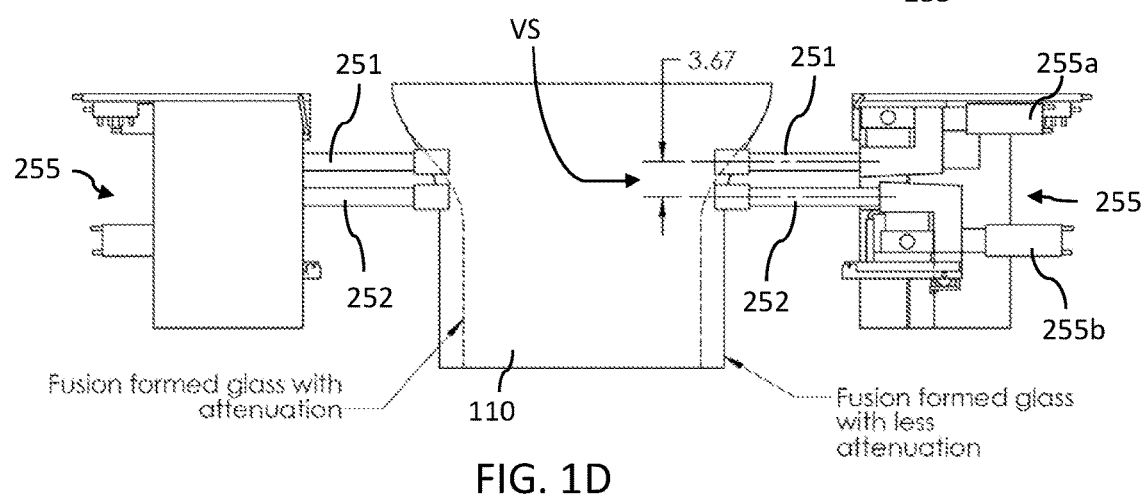
Figure 1E:
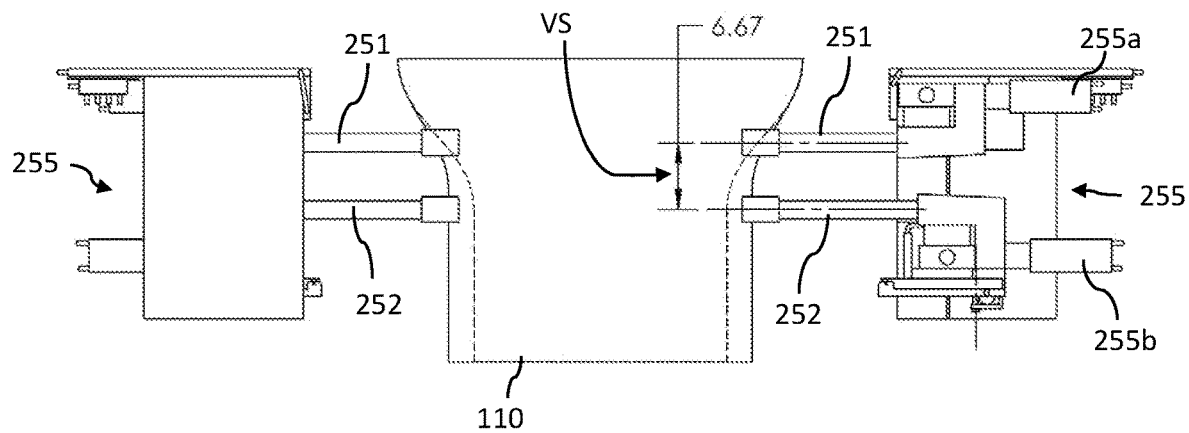

FIGS. 1C-1E show an example arrangement of a dual-elevation edge roll system according to some embodiments. In this embodiment, the edge rollers 250 include upper edge rollers 251 and a set of lower edge rollers 252 engaging the glass sheet 110 being drawn in a downdraw process. Each of the dual-elevation edge rollers 250 has an associated edge roller assembly 255. Each of the associated edge roller assemblies 255 has a first set of drive motors 255a for driving the upper edge rollers 251 and a second set of drive motors 255b for driving the lower edge rollers 252. The edge roller assembly 255 is configured to be able to adjust the vertical spacing VS between the upper edge rollers 251 and the lower edge rollers 252 to a desired spacing. The vertical spacing VS is defined as the spacing between the rotational axes (same as the longitudinal axes) of the upper edge rollers 251 and the rotational axes of the lower edge rollers 252. In the illustrated example, the vertical spacing VS can be adjusted to be between 3.67 inches to 6.67 inches. In some embodiments, the vertical spacing VS can be adjusted to be between 3.67 inches to 5.67 inches. In some embodiments, the vertical spacing VS can be adjusted to be between 3.67 inches to 5.67 inches. These dimensions can be changed to accommodate any variations in the requirements among the different process recipes for different glass formulations. The assembly of the lower edge rollers 252 with their associated components such as the spindles and drive motors 255b is raised or lowered while maintaining alignment using appropriate structures such as a vertical key and a keyway using a jackscrew.

Figures 2A, 2B, 2C:
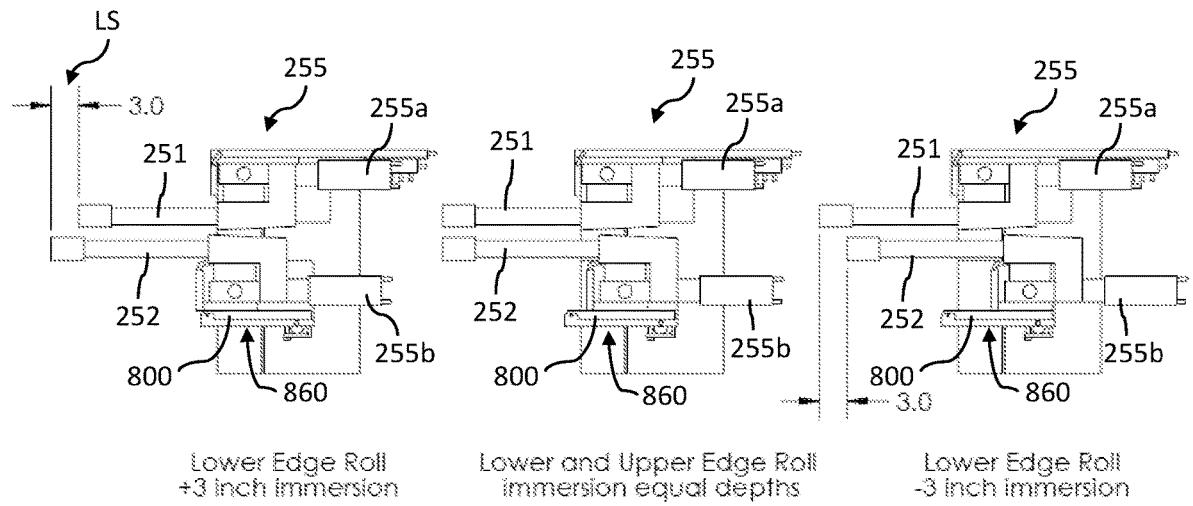
FIGS. 2A-2C illustrate the horizontal adjustability of the dual-elevation edge roll assembly according to the present disclosure.

Referring to FIGS. 2A-2C, according to some embodiments, the dual-elevation edge roller assembly 255 is configured to provide lateral/horizontal adjustability of the upper edge rollers 251 and the lower edge rollers 252. The edge roller assembly 255 is configured to be able to adjust the positions of the upper edge rollers 251 and the lower edge rollers 252 with respect to each other so that the lateral spacing LS between the upper edge rollers 251 and the lower edge rollers 252 can be adjusted to a desired spacing. In the illustrated example, the edge roller assembly 255 is configured so that the lateral position of the upper edge rollers 251 is fixed and the lateral position of the lower edge rollers 252 can be adjusted with respect to the upper edge rollers 251. In an embodiment, the lower edge rollers are fixed and the upper edge rollers are adjustable. In a further embodiment, both the upper and lower edge rollers are adjustable. The lateral spacing LS can be adjusted to be between +3.0 inches ("+" denoting that the lower edge rollers 252 extend further toward the glass sheet 110 (i.e., greater immersion) than the upper edge rollers 251) and −3.0 inches ("−" denoting that the lower edge rollers 252 extend less than the upper edge rollers 251). In some embodiments, the lateral spacing LS can be adjusted to be between +2.0 inches and −2.0 inches. In some embodiments, the lateral spacing LS can be adjusted to be between +1.0 inch and −1.0 inch. These two configurations are illustrated in FIGS. 2A and 2C, respectively. These dimensions can be changed to accommodate any variations in the requirements among the different process recipes for different glass formulations. In order to permit this movement of the lower edge rollers 252, the entire lower edge roller assembly including the associated components such as the spindles and the drive motors 255b can be mounted to the top side of a dovetail slide table 800. The bottom half of the slide table 810 can be mounted to a support bracket 860 (See FIGS. 8A-8B). In such slide table mechanism, the linear movement of the slide table 800 is accomplished via rotation of a slide screw 880.

Figures 2D, 2E:
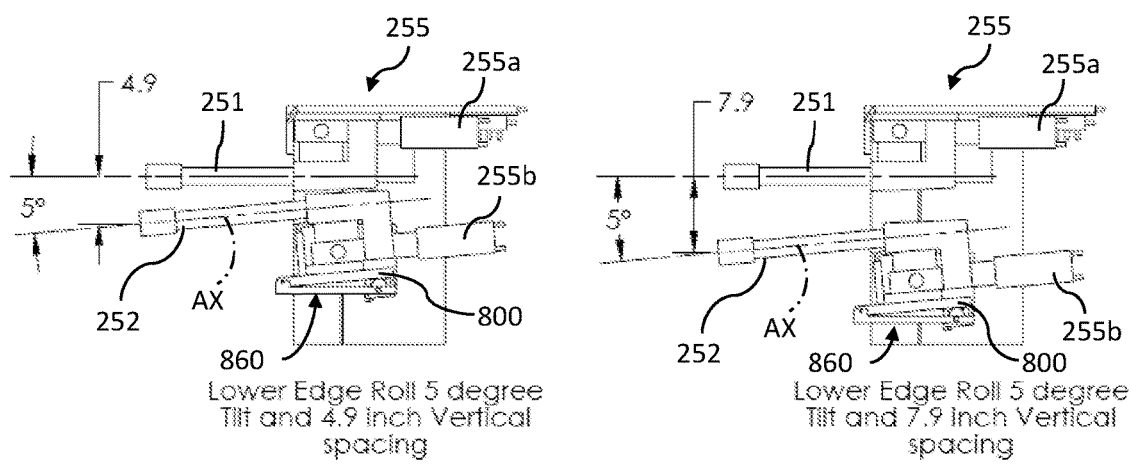
FIGS. 2D-2E illustrate the tilt angle adjustability of the lower pair of edge rollers in the dual-elevation edge roll assembly according to the present disclosure.

Referring to FIGS. 2D-2E, according to some embodiments, the dual-elevation edge roller assembly 255 is configured to be able to adjust the tilt angle of the lower edge rollers 252. In the illustrated example, the tilt angle of the rotational axis AX of the lower edge rollers 252 can be adjusted be up to 5° with respect to the rotational axis of the upper edge rollers 251. As will be described in more detail below in conjunction with FIGS. 8A-8C, the tilting of the lower edge rollers 252 is achieved by the particular configuration of the dovetail slide table 800 and the support bracket 860. These dimensions can be changed to accommodate any variations in the requirements among the different process recipes for different glass formulations in order to optimize the benefits of the edge rolling such as minimizing the glass sheet width attenuation and controlling the edge bead thickness of the glass sheet.

Figure 3A:
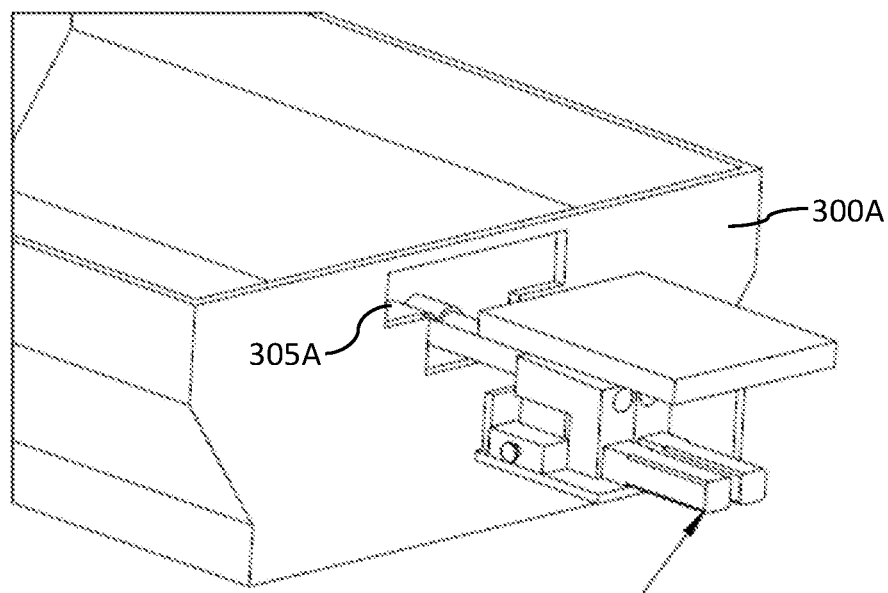
FIG. 3A is an illustration of a prior art upper transition portion of the fusion downdraw system configured for the dual-elevation edge roll assembly.

FIG. 3A shows the upper transition portion 300A of a fusion downdraw system configured for the single-elevation edge roller assembly 155 of a prior art system. In this embodiment, the upper transition portion 300A comprises an access opening 305A having an appropriate shape and dimension for receiving the edge rollers 150. The access opening 305A allows the edge rollers 150 to reach the glass sheet 110 being drawn inside the upper transition portion 300A.

Figure 3B:
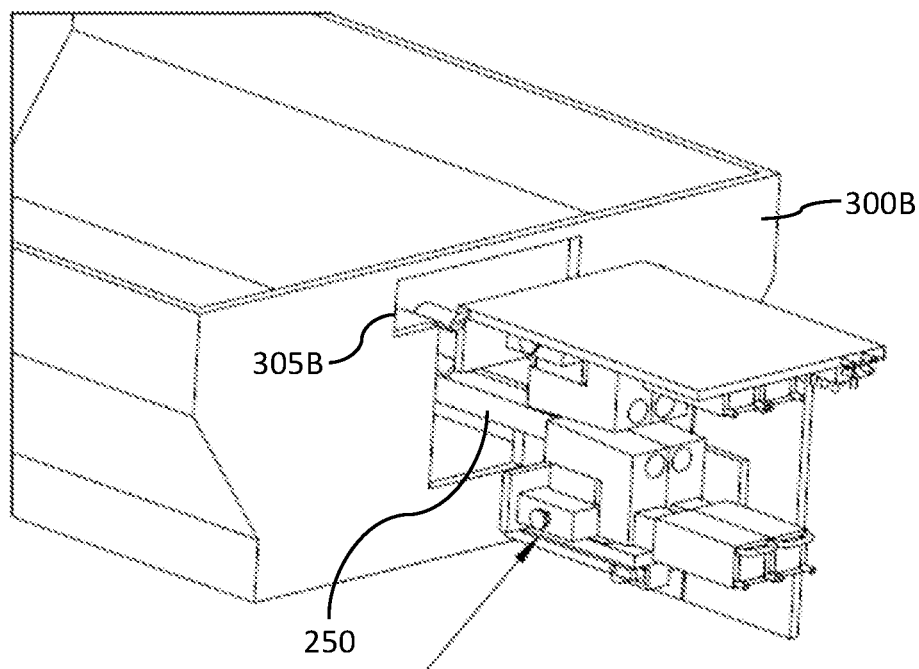
FIG. 3B is an illustration of the upper transition portion of the fusion downdraw system configured for the dual-elevation edge roll assembly according to the present disclosure.

FIG. 3B shows the upper transition portion 300B of a fusion downdraw system configured for the dual-elevation edge roller assembly 255 in accordance with an embodiment of the present disclosure. In this embodiment, the upper transition portion 300B comprises an access opening 305B having an appropriate shape and dimension for receiving the edge rollers 250. The access opening 305B allows the edge rollers 250 to reach the glass sheet 110 being drawn inside the upper transition portion 300B.

FIGS. 4A-4F are illustrations showing the seal plate 400 that provides sealing and a thermal barrier while allowing the dual-elevation edge rollers 251, 252 to penetrate into the upper transition portion 300B and into the fusion downdraw system's interior to reach the glass sheet 110. Referring to FIGS. 4A and 4B which are side views of the dual-elevation edge rollers 251, 252 with a cross-section view of the seal plate 400, the seal plate 400 is configured with two sets of bushings 410, 420 providing the through holes for the edge rollers 251, 252, respectively. In this example, the upper bushings 410 have straight inner surface providing straight through holes that receive the upper edge rollers 251. The lower bushings 420 have inner surface 422 that are double tapered for receiving the lower edge rollers 252 and accommodate the range of angles at which those rollers can be tilted. As shown in FIG. 4C, the inner surface 422 is double tapered at angles T1 and T2. The opening of the lower bushing 420 facing the outside of the upper transition portion 300B is tapered at the angle T1 and the opening of the lower bushing 420 that is facing the interior of the upper transition portion 300B is tapered at the angle T2. In this example, the angles T1 and T2 are 6°. In one embodiment, the angles T1 and T2 are between 4° and 8°. In another embodiment, the angles T1 and T2 are between 3° and 9°.

Referring to the exploded view shown in FIG. 4D, the seal plate 400 comprises a first seal plate portion 401 that includes the upper bushings 410 and a second seal plate portion 402 that includes the lower bushings 420. As denoted by the spacing 430 between the upper bushings 410 and the lower bushings 420 in FIG. 4C, the first seal plate portion 401 and the second seal plate portion 402 are configured to have their separation spacing 430 adjusted without diminishing the seal plate's sealing function. In this example embodiment, the separation spacing 430 is 0.47 inches. In other embodiments, the separation spacing 430 can be between 0.0 up to 0.55 inches. As shown in FIG. 4D, the seal plate assembly 400 comprising the first seal plate portion 401 and the second seal plate portion 402 are assembled to the upper transition portion 300B by being secured to a back plate 450. The first seal plate portion 401 is first secured to the back plate 450. Then, the second seal plate portion 402 is secured to the back plate 450 over the first seal plate portion using a pair of threaded bolts 455 extending from the back plate 450. The second seal plate portion 402 comprises a pair of slots 404 that align with the two bolts 455 and can be secured using nuts 456 that thread onto the threaded bolts 455. FIG. 4E shows the front view of the fully assembled seal plate assembly 400. The slots 404 allow the position of the second seal plate portion 402 to be adjusted to select a desired separation spacing 430 discussed above. FIG. 4F is a sectional view of the assembled seal plate assembly 400 taken through the line A-A noted in FIG. 4E.

Figure 5A:
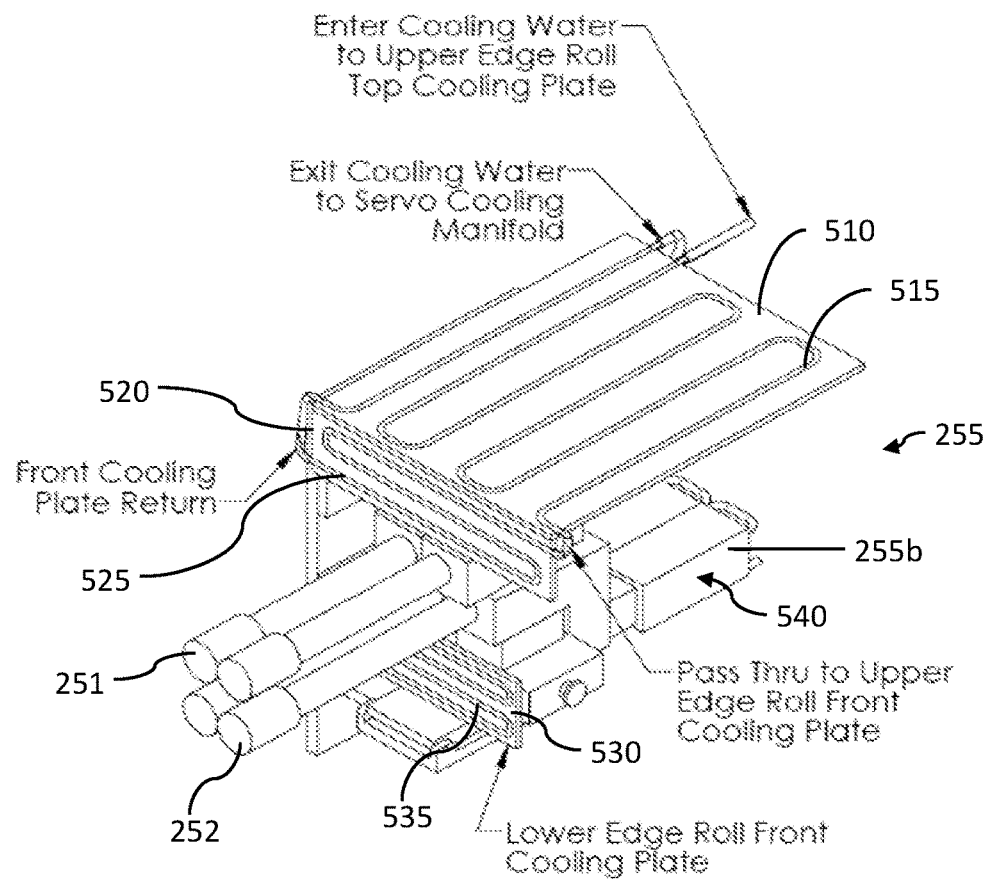
FIGS. 5A-5B illustrate the special thermal protection allowances of water cooling shields/manifolds for the dual-elevation edge roll assembly.
Figure 5B:
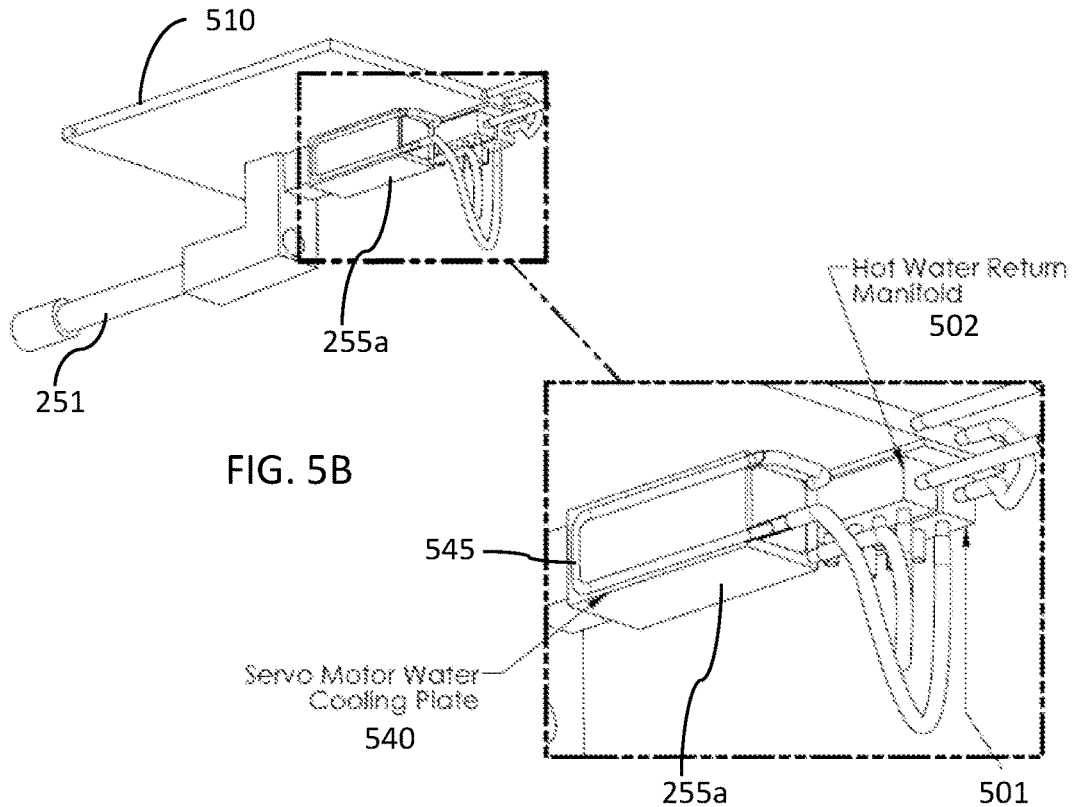

Referring to FIGS. 5A-5B, the special thermal protection scheme implemented for protecting the dual-elevation edge roller assembly 255 and the associated components is disclosed according to some embodiments. The location of the edge roller assembly 255 is in a very thermally hostile environment so thermal protection of the equipment, bearings, seals, drive motors and services, etc. is extremely important. The thermal protection scheme comprises a plurality of liquid-cooled cooling plates 510, 520, 530, 540 (i.e. radiators). The cooling plates can be made of any material having good thermal conductivity and durable in high heat environment. Metal such as aluminum is a suitable choice for the cooling plates 510, 520, 530, 540. Each of the cooling plates comprises sealed channels or passage ways 515, 525, 535, 545 through which the coolant liquid is pumped through to extract heat from the cooling plates. The liquid coolant can be water or non-corrosive liquid like those used in automobile radiators. In the illustrated example, the front cooling plates 520 and 530 are located between the upper transition portion 300B and the edge roller assembly 255. The top cooling plate 510 is located on the top side of the edge roller assembly 255. In addition, cooling plates 540 comprise multiple plates that form an encapsulation or a box for each of the electric drive motors 255a and 255b surrounding the servo motors to keep them cooled. As shown in FIG. 5B, the body and the drive motors 255a of the upper edge rollers 251 are attached to the top cooling plate 510 to maximize the cooling of the upper edge rollers' drive motors 255a. The flow of the liquid coolant is managed through a pair of a coolant supply manifold 501 and a coolant return manifold 502. The location of the cooling plates 510, 520, 530, 540 are not limited to the particular locations illustrated in this example embodiment but should be positioned at locations to maximize their cooling function. The size of the cooling plates should be adjusted to optimize their cooling function.

The spindle housings contain bearings and seals to support rotation of the roll shafts. The internal cavity employs continuous lubrication in the form of circulated oil. The spindle housing comprises a labyrinth of channels/passages for the liquid coolant. Each of the cooling plates comprises the allowances of water cooling shields/manifolds for the dual-elevation edge roll assembly. The metal spindle housings are configured to have minimum thickness to permit close vertical centerlines while maintaining appropriate bearing and seal dimensions for the roll shafts. Internal liquid cooling holes are located to best minimize this dimension as well. The spindle assembly design is such that the lower spindles can be inverted to be used on the upper spindle location. Internal oil lubrication paths have been designed such that full lubricate "wetting" is achieved in either orientation without any physical mechanical or plumbing changes. This eliminates both an upper and a lower design, additional spare parts or operator error.

Referring to FIGS. 6A-6D, another feature of the dual-elevation edge roll system according to an embodiment is a mechanism that allows the lower edge rollers 252 to be independently aligned laterally in relation to the upper edge rollers 251. The directions of the lateral adjustment is denoted by the double-headed arrow L in FIG. 6A. The adjustment can be made with linear motions in the two opposing directions noted by the arrow L. This capability allows adjustments on the fly during the fused downdraw process. This is beneficial and necessary because as the thermal and mechanical load during operation can cause the lower and upper edge rollers to misalign even though they were aligned at room temperature. If the upper edge rollers 251 and the lower edge rollers 252 are not aligned, the glass sheet cannot be drawn straight down between the two sets of rollers which is not desired. By making the alignment adjustment on the fly, the fused downdraw process does not have to be interrupted.

Figure 6A:
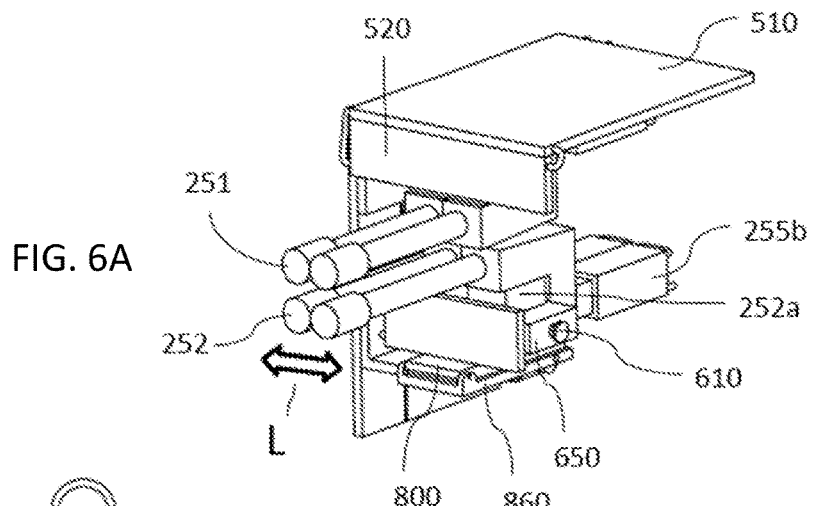
FIGS. 6A-6D illustrate the mechanism that allows the lower edge rollers to be independently aligned laterally in relation to the upper edge rollers.
Figure 6B:
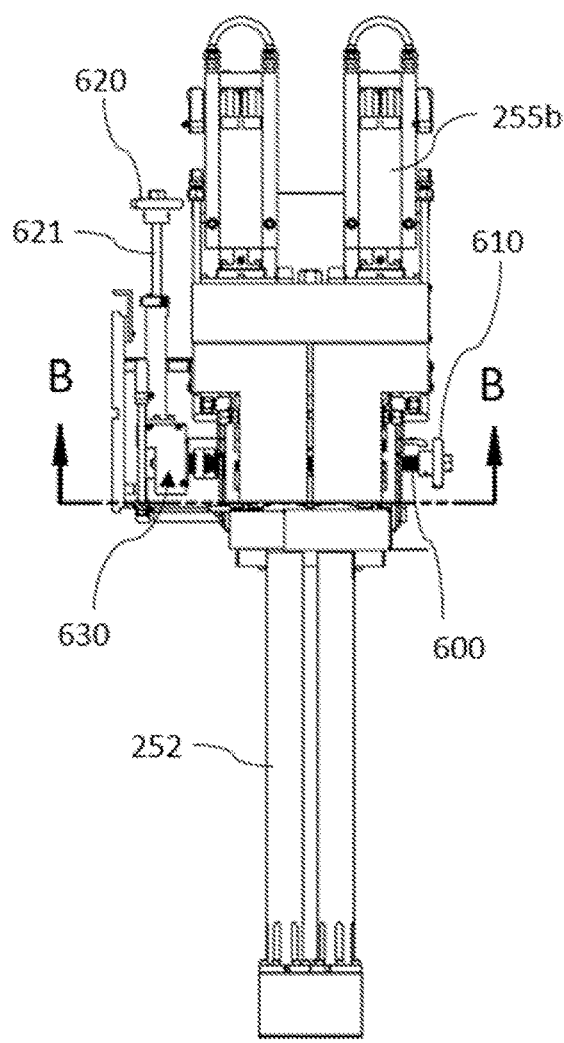
Figure 6C:
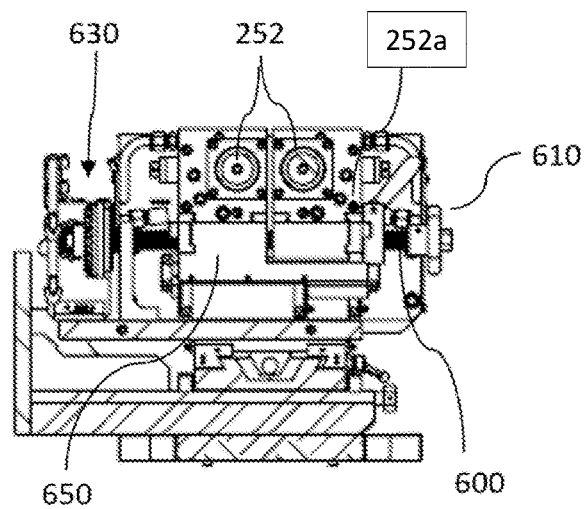
Figure 6D:
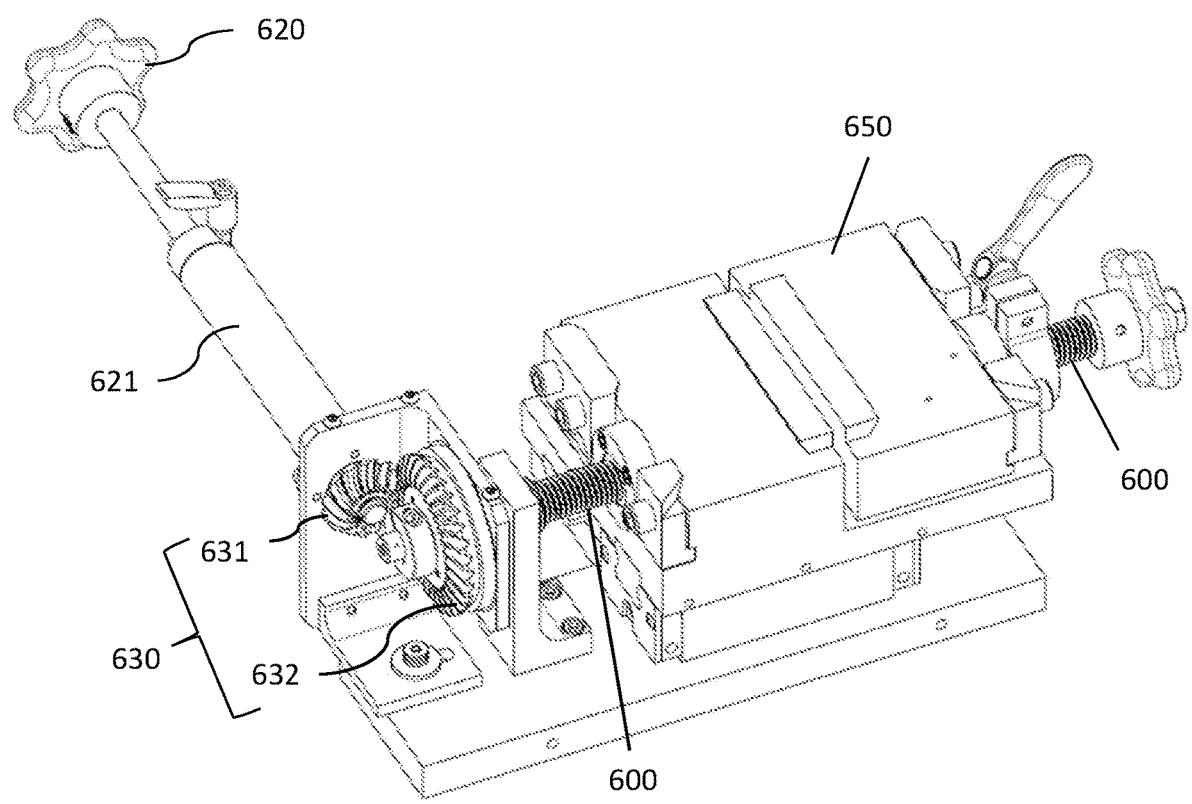

The linear motion for the lateral adjustment of the lower edge rollers 252 is achieved by a slide screw 600 arrangement shown in detail in FIGS. 6C and 6D. The lower edge rollers 252 have a body portion 252a (see FIGS. 6A and 6C) which is mounted on a linear motion platform 650 (see FIGS. 6A, 6C, and 6D). The linear motion platform 650 is driven by a slide screw 600 that is oriented orthogonal to the rotational axes (i.e. the longitudinal axes) of the lower edge rollers 252. The slide screw 600 is threaded and the linear motion platform 650 has one or more corresponding threaded chuck portion (not shown) that threadably engage the slide screw 600. Thus, by turning the slide screw 600 clockwise or counterclockwise, the linear motion platform 650 can be moved linearly in one of two opposing directions parallel to the slide screw 600 matching the directions noted by the double-headed arrow L in FIG. 6A. The direction of the thread on the slide screw 600, i.e. whether it is left-handed or right-handed, will determine the direction of the turn and the direction of the platform's movement. As shown in FIGS. 6A-6C, at one end of the slide screw 600 comprises a control knob 610 that would be used by an operator to turn the slide screw 600 for making the lateral adjustment of the lower edge rollers 252.

Referring to FIGS. 6B, 6C, and 6D, in another embodiment, a control shaft 621 oriented in a longitudinal direction that is substantially orthogonal to the longitudinal direction of the slide screw 600 and engaging the slide screw is provided. The slide screw 600 can be turned by turning the control shaft 621. The control shaft 621 and the slide screw 660 can engage each other by way of a bevel gear arrangement 630. This configuration allows the operator to turn the slide screw 600 from a different location using a second control knob 620 attached to the control shaft 621.

Referring to FIG. 6D, in the illustrated example, the bevel gear arrangement 630 comprises a first bevel gear 631 attached to the second control knob 620 and a second bevel gear 632 attached to the slide screw 600 and the two bevel gears engage each other in an orthogonal configuration shown in FIG. 6D. The first bevel gear 631 is attached to the second control knob 620 via the associated second control shaft 621, the first bevel gear 631 being attached at an end of the second control shaft 621. The bevel gear arrangement 630 allows an operator to move the linear motion platform 650, and in turn the lower edge rollers 252, by turning the second control knob 620 clockwise or counterclockwise. In the illustrated example, the bevel gear arrangement 630 is configured for an orthogonal relationship between the slide screw 600 and the second control shaft 621. However, the bevel gear arrangement 630 can be configured for a variety of desired angular relationship between the slide screw 600 and the second control shaft 621 according to other embodiments. The control knob 610 is provided at an end of the slide screw 600 that is opposite from the bevel gear arrangement 630.

It should be noted that although the configuration illustrated in FIGS. 6A-6D performs the lateral adjustment of the lower edge rollers 252 by manual operation by an operator, one of ordinary skill in the art can convert it to be automated or remotely controlled by connecting the slide screw 600 and/or the second control shaft 621 to electric motors, for example.

Referring to FIGS. 7A-7D, a coaxial locking collar assembly 700 for the threaded slide screw 600 is disclosed. The locking collar assembly 700 is threaded over the slide screw 600 and secured to the linear motion platform 650 (see FIG. 7A) and is used to prevent the slide screw 600 from unintentionally being turned after the lateral adjustment of the lower edge rollers 252 is completed. The locking collar assembly 700 comprises a collar piece 701 and a threaded bushing 760. The collar piece 701 is preferably a unitary piece comprising two portions: a locking portion 710, and a fixed portion 720. The locking portion has a central bore 705 extending there through for receiving the slide screw 600 there through. The fixed portion 720 has a second central bore 705A that is coaxially aligned with the central bore 705 of the locking portion.

Figure 7A:
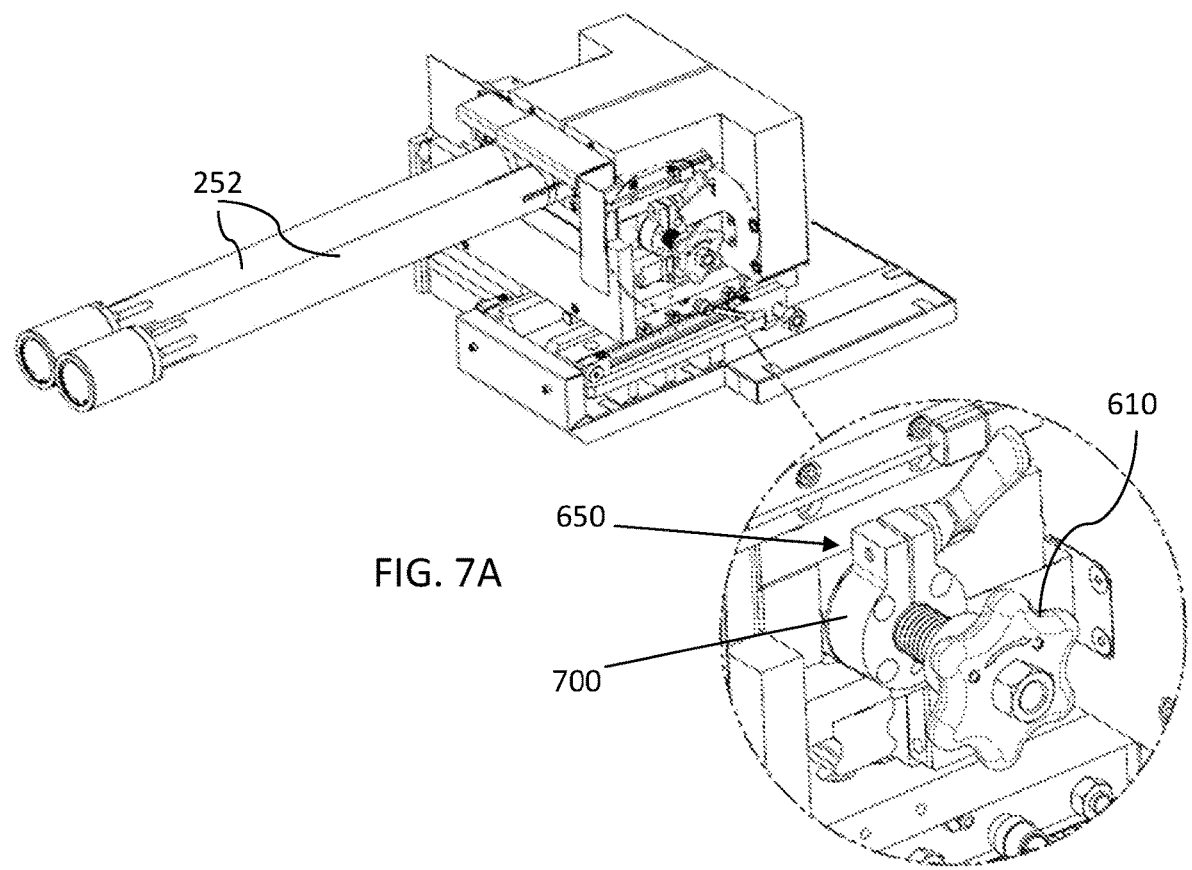
FIGS. 7A-7D illustrate the coaxial locking collar for the threaded slide screw of the edge roller lateral alignment assembly.
Figure 7B:
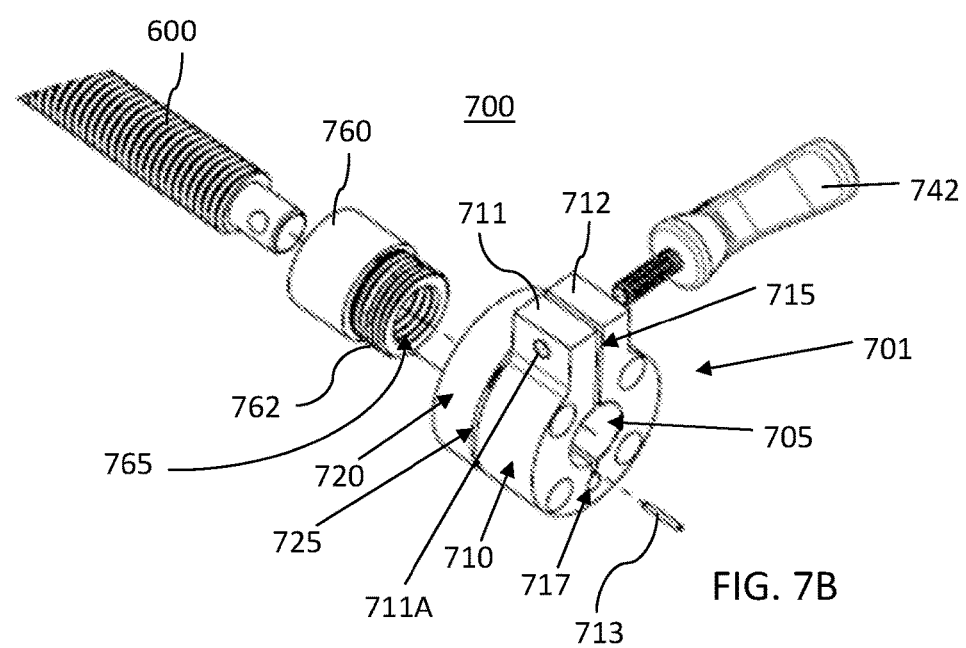
Figure 7C:
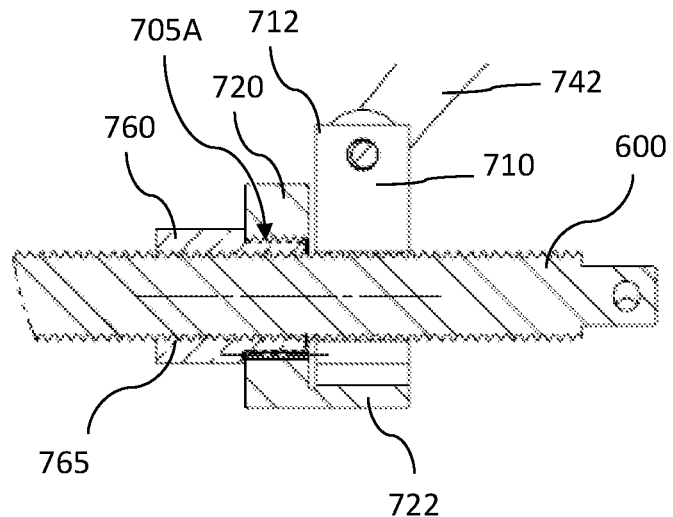
Figure 7D:
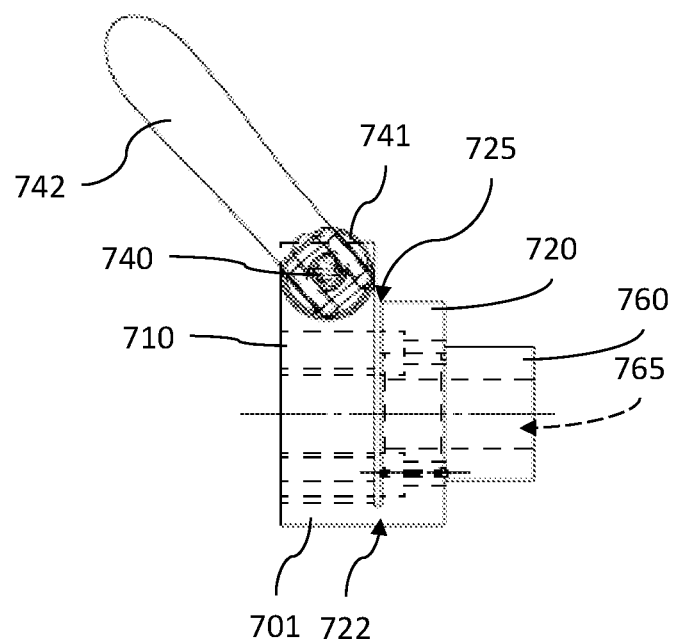

Referring to FIG. 7C, the second central bore 705A of the fixed portion 720 is female threaded for threadably receiving a male threaded portion 762 of the threaded bushing 760 and has a larger diameter than the first central bore 705 of the locking portion 710. The threaded bushing 760 has female threaded central bore 765 that extends through its entire length so that when the threaded bushing 760 is threaded into the second central bore 705A of the fixed portion 720 the central bore 765 of the threaded bushing 760 and the central bore 705 of the locking portion 710 are coaxially aligned for receiving the slide screw 600 there through.

As shown in FIGS. 7B-7C, the locking portion 710 and the fixed portion 720 of the collar piece 701 are defined by a cut or a gap 725 that extends partially through the collar piece 701 in a transverse orientation to the central bore 705. Because the gap 725 extends partially through the collar piece, the two portions 710, 720 are connected by a connecting portion 722 (see FIG. 7D).

Referring to FIG. 7B, the locking portion 710 has a radially extending slot 715 that extends through the central bore 705 and separates one side of the locking portion 710 into two ends 711, 712 like a shape of a "C". When the slide screw 600 is threaded through the threaded central bore 765 of the bushing 760 and extending through the central bore 705 the C-shape allows the locking portion 710 to clamp or lock onto the slide screw 600 by bringing the two ends 711, 712 of the C-shape towards each other and reducing the diameter of the central bore 705 and clamping around the slide screw 600. In the illustrated example embodiment, the clamping action is accomplished by a threaded locking screw 740. In order to accommodate the locking screw 740, the two ends 711, 712 of the C-shape are extended outward (away from the central bore 705) into flattened tabs as shown. A first of the two flattened tabs 711, 712 has a threaded hole to threadably receive the locking screw 740 and the second of the two flattened tabs 711, 712 has an unthreaded through-hole allowing the locking screw 740 to reach the threaded hole. In the illustrated example, the first flattened tab 711 comprises a threaded hole 711A and the second flattened tab 712 comprises the unthreaded through-hole (not shown). The locking screw 740 is inserted through the through-hole in the second flattened tab 712 and threaded into the threaded hole 711A. The locking screw 740 has a flared head 741 that pushes against the second flattened tab 712 as the locking screw 740 is threaded and tightened thus bringing the two flattened tabs 711, 712 closer together and clamping the locking portion 710 around the slide screw 600. In some embodiments, the flared head 741 also has a handle portion 742 allowing an operator to turn the screw 740 by hand.

In some embodiments, the locking portion 710 comprises an additional radially extending slot 717 that is cut into the interior surface of the central bore 705 and located directly across the central bore 705 in relation to the radially extending slot 715. This additional radially extending slot 717 provides additional flexibility to the C-shaped locking portion 710 and allow the two ends 711, 712 of the locking portion 710 to be brought together with less effort. In some embodiments, the additional radially extending slot 717 terminates in a rounded shape as shown in FIG. 7B. The rounded shape at the end of the additional radially extending slot 717 provides a stress-relieving function at the end of the additional radially extending slot 717 and minimizes any fatigue cracking as the locking portion 710 goes through many cycles of locking and unlocking operation. In some embodiments, a pin 713 is provided for locking the threaded bushing 760 and the collar piece 701 together after the threaded bushing 760 has been threaded into the collar piece 701. The pin 713 inserted through the additional radially extending slot 717 and into a receiving hole provided in the male threaded end of the threaded bushing 760.

Referring to FIGS. 8A-8D, a mechanism for adjusting the position and attitude of the lower edge rollers 252 is disclosed. In order to permit the movement of the lower edge rollers 252 discussed above, the entire lower edge roller assembly portion of the edge roller assembly 255, including the associated components such as the spindles and the drive motors 255b for the lower edge rollers, can be mounted to the top side of a dovetail slide table 800, as seen in FIG. 6A. The bottom half 810 of the slide table 800 can be mounted to a support bracket 860. In this slide table mechanism, the linear movement of the slide table 800 is accomplished via rotation of a slide screw 880.

Figure 8D:
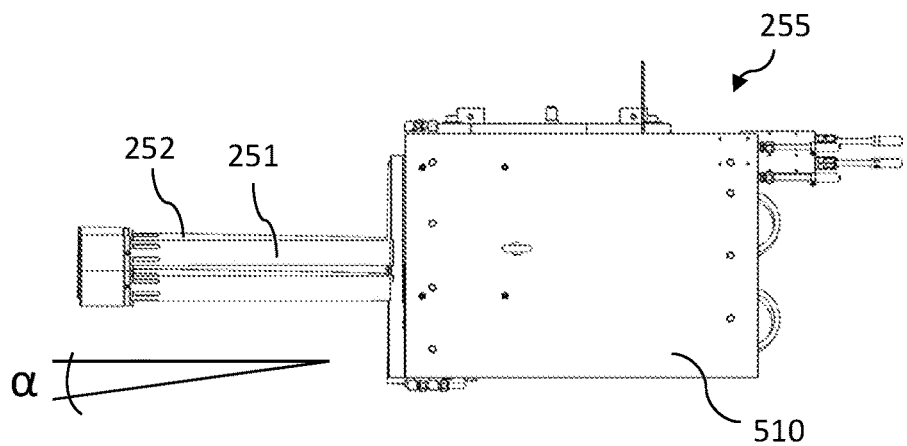

The support bracket 860 holding up the slide table 800 comprises a plurality of adjustable set screws S1, S2 for adjusting the position and attitude of the slide table 800 and, in turn, the position and attitude of the lower edge rollers 252. The adjustable set screws S1, S2 contact the bottom half 810 of the slide table 800 to achieve this. Referring to FIG. 8B, the bottom half 810 of the slide table 800 is mounted on the bracket 860 and sits on top of the height adjusting set screws S2. The bottom half 810 of the slide table 800 is positioned between the attitude adjusting set screws S1. By lowering or raising the height adjusting set screws S2, the overall height or the vertical position of the slide table 800 can be adjusted to a desired position. By selectively lowering or raising individual height adjusting set screws S2 to different levels, one side of the slide table 800 can be made to be higher than the other thus controlling the tilt angle of the slide table. By selectively adjusting the attitude adjusting set screws S1 to urge the slide table 800 in desired direction in the horizontal plane. Therefore, using the set screws S1, S2 the position and attitude of the slide table 800 can be controlled or adjusted. In other words, to borrow the terms used with boats or airplanes, the roll, pitch, and yaw of the slide table 800 can be adjusted by the use of the set screws S1, S2. For example, referring to FIG. 8D, which is a top-down view of the edge roller assembly 255, by adjusting the yaw of the slide table 800, the lower edge rollers 252 can be adjusted to be at an angle α with respect to the upper edge rollers 251.

In another embodiment, a support bracket 860 is disclosed where the support bracket 860 comprises a plurality of bottom supporting surfaces 862, each comprising one or more adjustable set screws S2 that can be raised and lowered with respect to the bottom supporting surfaces 862; and a plurality of side supporting surfaces 864. Each of the side supporting surfaces 864 comprises one or more adjustable set screws S1 that can be raised and lowered with respect to the corresponding side supporting surfaces 864. With this arrangement, when an object, such as the slide table 800, is placed on the support bracket 860 and contacting the plurality of bottom supporting surfaces 862 and the plurality of side supporting surfaces 864, the object's vertical position and attitude (i.e., height, pitch (or tilt), and roll) can be adjusted by adjusting the one or more adjustable set screws S2 provided on each of the plurality of bottom supporting surfaces 862 and the object's lateral position or attitude (i.e., yaw) can be adjusted by adjusting the one or more adjustable set screws S1 provided on each of the plurality of side supporting surfaces 864.

Figure 9:
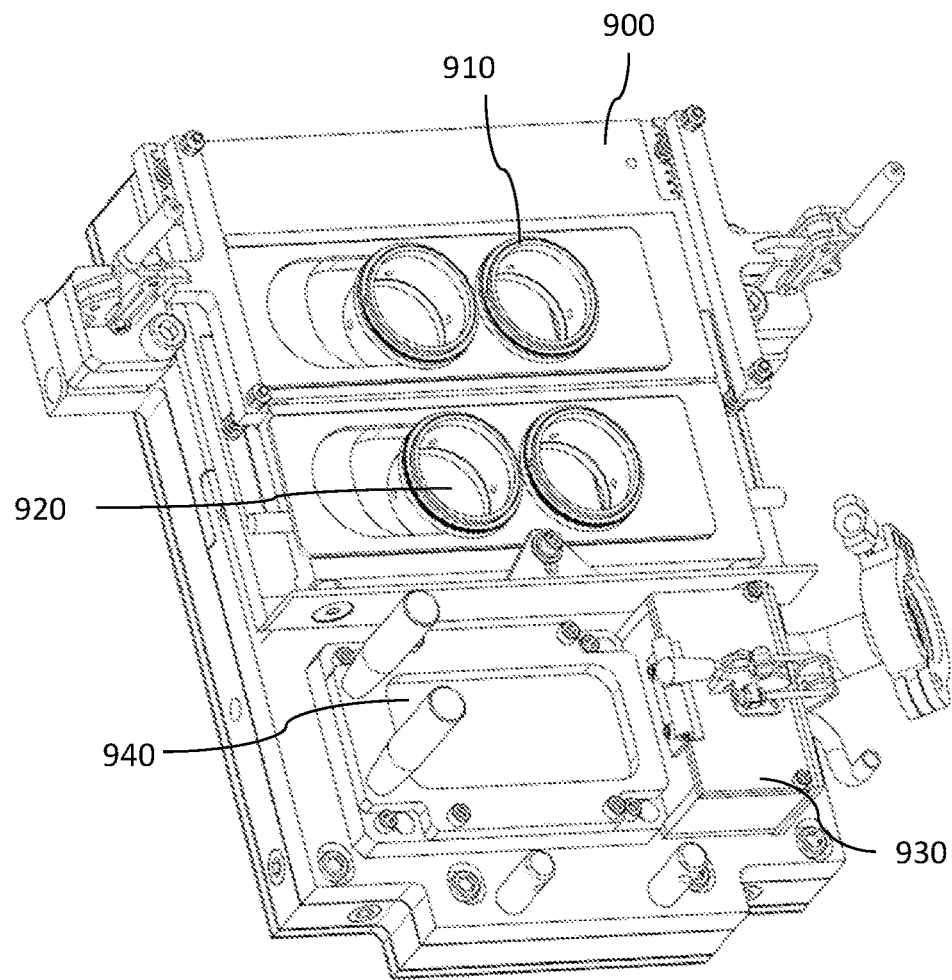
FIG. 9 shows the new seal plate designed to accommodate a viewing window and a Boron Filtration System.

In some fused downdraw glass forming process, a Boron filtration system may be needed. The Boron filtration system can be incorporated into the seal plate that enables the edge rollers access to the interior of the upper transition portion 300A. FIG. 9 shows a seal plate 900 that is similar to the seal plate 400 shown in FIG. 4A but has been modified to accommodate a Boron filtration system unit 930 and a viewing window 940. The viewing window 940 and the Boron filtration system unit 930 are provided below the upper edge roller bushings 910 and the lower edge roller bushings 920.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombinations.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated herein, various embodiments for laser welded glass packages and methods of making the same have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A coaxial locking collar assembly comprising:
a collar piece comprising:

a locking portion comprising a central bore extending there through for receiving a threaded screw there through; and a fixed portion comprising a second central bore that is coaxially aligned with the central bore of the locking portion; and a threaded bushing comprising a central bore that extends through its entire length and a male threaded portion;

wherein the second central bore of the fixed portion is female threaded for threadably receiving the male threaded portion of the threaded bushing;

wherein the threaded bushing is configured to be threaded into the second central bore of the fixed portion, the central bore of the threaded bushing and the central bore of the locking portion are coaxially aligned for receiving the threaded screw there through;

wherein the locking portion and the fixed portion of the collar piece are defined by a cut or a gap that extends partially through the collar piece in a transverse orientation to the central bore; and wherein the locking portion comprises a radially extending slot that extends through to the central bore and separates one side of the locking portion into two ends, wherein the threaded bushing is configured to be threaded into the second central bore of the fixed portion and the threaded screw is configured to be threaded through the threaded central bore of the threaded bushing and extend through the central bore of the locking portion, bringing the two ends of the locking portion towards each other, reducing the diameter of the central bore of the locking portion and clamping or locking onto the threaded screw.

2. The coaxial locking collar assembly of claim 1, wherein the collar piece is a unitary piece.

3. The coaxial locking collar assembly of claim 1, wherein the second central bore of the fixed portion has a larger diameter than the central bore of the locking portion allowing the threaded portion of the threaded bushing to be threadably received into the second central bore.

4. The coaxial locking collar assembly of claim 1, wherein the two ends of the locking portion are extended outward into two flattened tabs, wherein a first flattened tab of the two flattened tabs comprises a threaded hole to threadably receive a locking screw and a second flattened tab of the two flattened tabs comprises an unthreaded through-hole allowing the locking screw to be inserted there through and reach the threaded hole in the first flattened tab of the two flattened tabs.

5. The coaxial locking collar assembly of claim 4, wherein the locking screw comprises a flared head that pushes against the second flattened tab as the locking screw is threaded into the first flattened tab bringing the two flattened tabs closer together by clamping the locking portion around the threaded screw.

6. The coaxial locking collar assembly of claim 1, wherein the locking portion comprises an additional radially extending slot that extends into a surface of the central bore of the locking portion and is located directly across the central bore of the locking portion in relation to the radially extending slot.

7. The coaxial locking collar assembly of claim 6, wherein the additional radially extending slot terminates with a stress-relieving rounded shape.

\* \* \* \* \*